Nov. 3, 1953

J. CARREYETTE 2,657,857

AIRCRAFT LOAD COMPUTING APPARATUS

Filed Oct. 22, 1951

Inventor
Jack Carreyette
By Ralph B. Stewart
Attorney

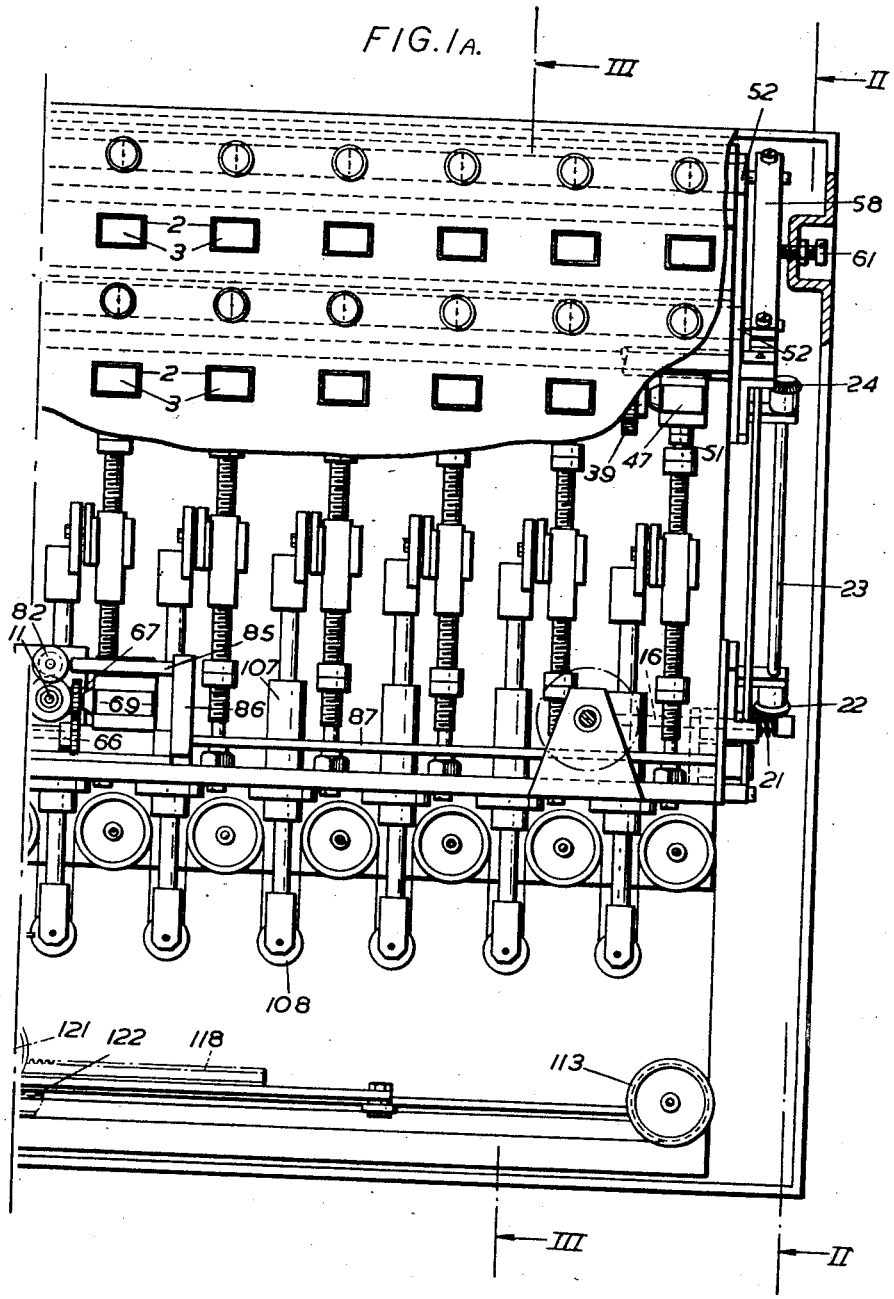

Nov. 3, 1953

J. CARREYETTE 2,657,857

AIRCRAFT LOAD COMPUTING APPARATUS

Filed Oct. 22, 1951

Inventor
Jack Carreyette
By Ralph B. Stewart
Attorney

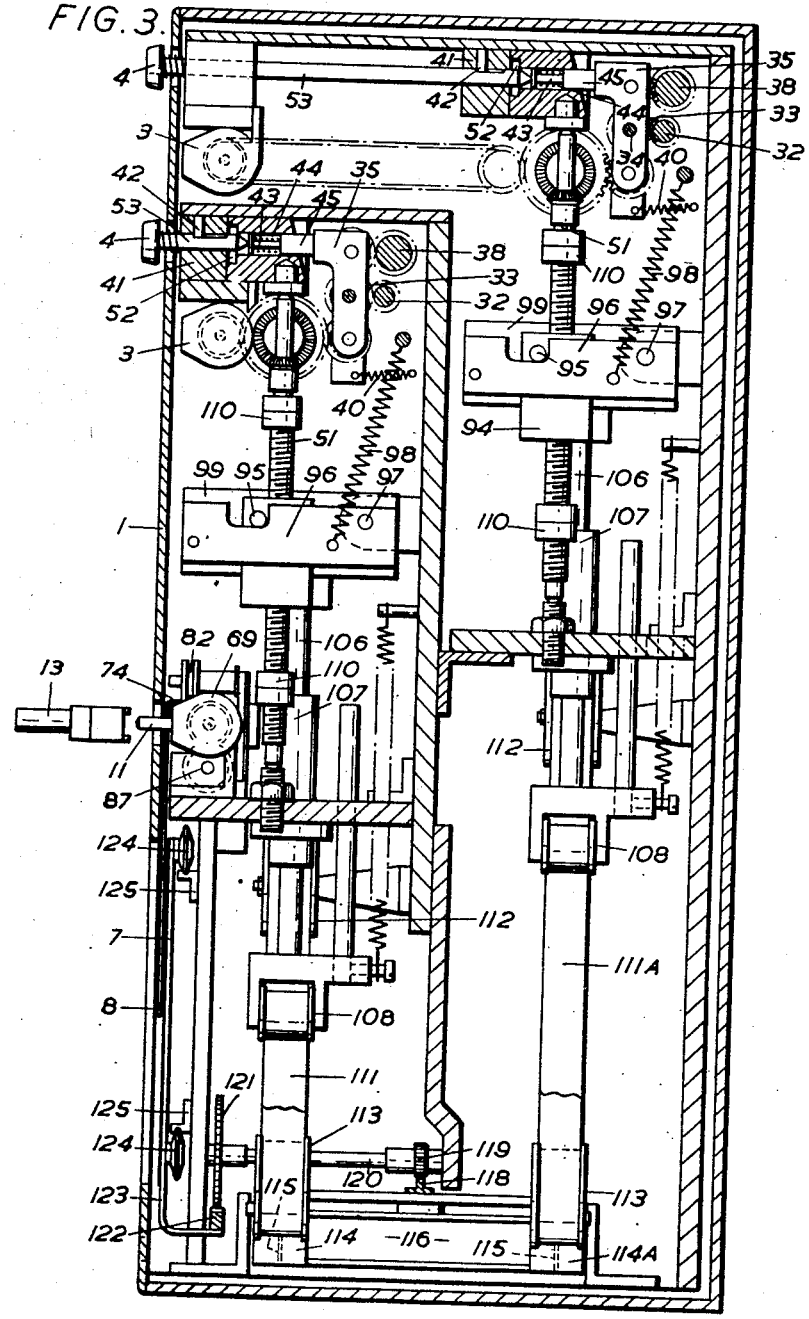

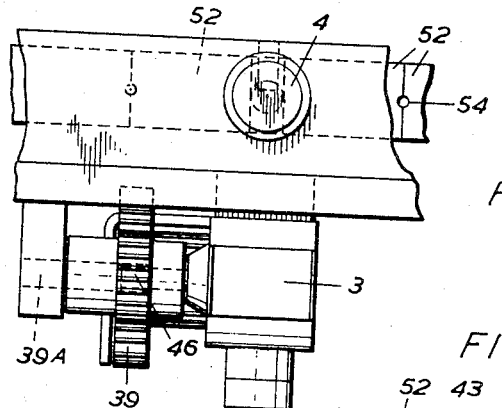
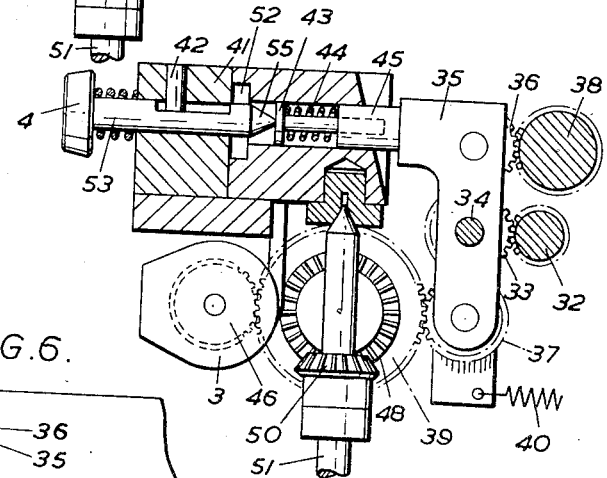
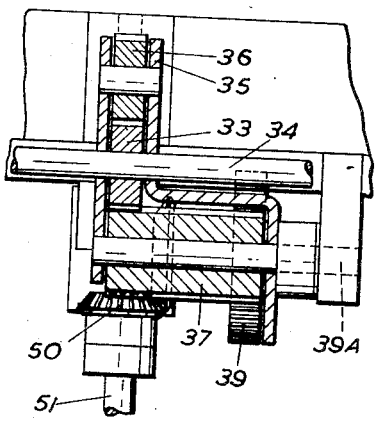
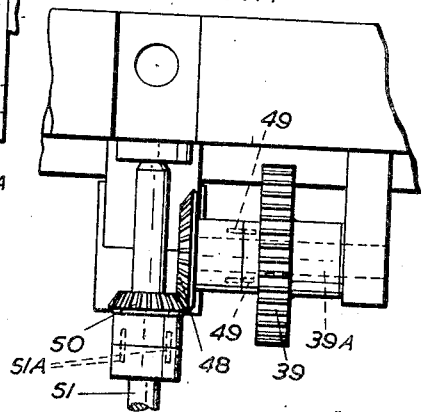

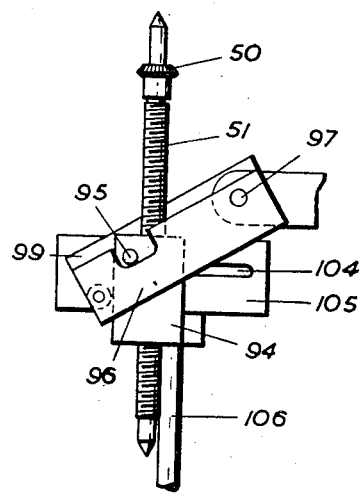
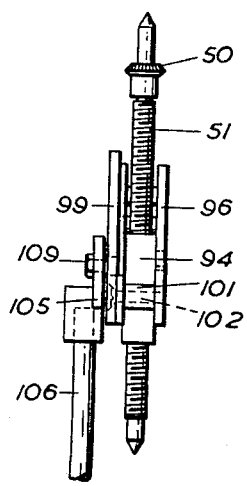
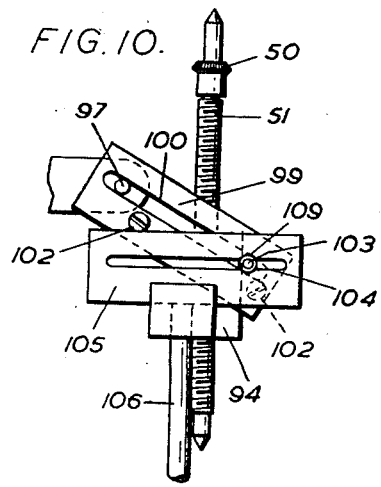

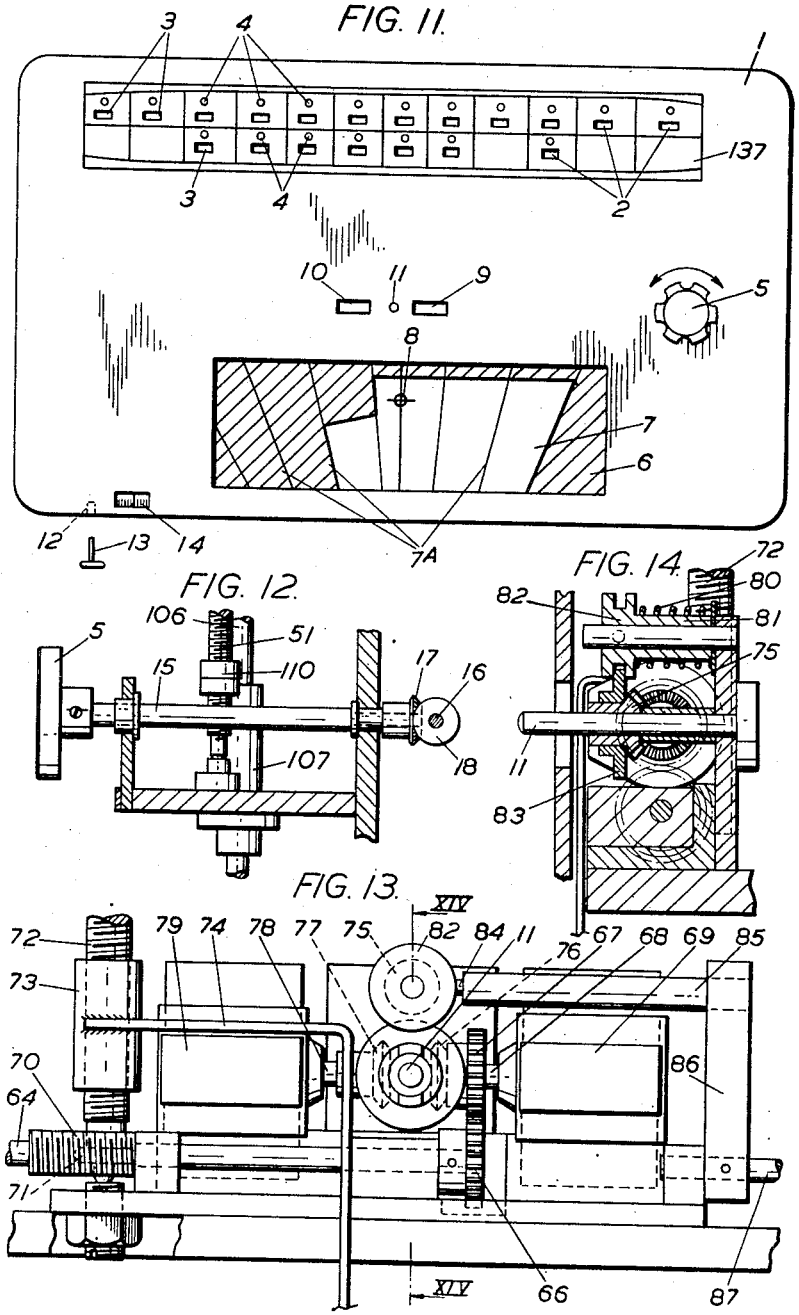

Patented Nov. 3, 1953

2,657,857

UNITED STATES PATENT OFFICE 2,657,857

AIRCRAFT LOAD COMPUTING APPARATUS

Jack Carreyette, Clifton, Bristol, England, assignor of one-half to British Overseas Airways Corporation, Brentford, England Application October 22, 1951, Serial No. 252,543

Claims priority, application Great Britain October 26, 1950

27 Claims. (Cl. 235—61)

The position of the centre of gravity of a loaded aircraft is dependent on the position of the centre of gravity of the unloaded aircraft and the distribution of the additional loads which the aircraft may carry in flight, such as fuel, freight, and passengers. Some of these loads, such as, for instance, fuel, vary while the aircraft is in flight, and it is necessary that the loads should be distributed so that the centre of gravity of the loaded aircraft lies between certain safe limits when the aircraft is loaded ready to take off and also that the centre of gravity should remain within these limits as the loads vary during flight. Safety regulations require that the position of the centre of gravity should be found and the loading adjusted until it is within safe limits before the aircraft takes off. The calculations necessary are usually carried out on a chart showing different loading points and the right answer is arrived at by a process of trial and error.

The present invention provides an apparatus which enables the position of the centre of gravity to be computed mechanically and shown, together with the total weight, graphically in relation to the permissible safe limits for the loaded weight and the centre of gravity. Moreover, the invention enables the effect of transferring a load from one point to another, or varying a load, to be shown graphically, and the complete arrangement of the loads at any moment to be seen as well as the total laden weight. The instrument may be used speedily without the need for any additional calculations by the operator so that no technical knowledge is required on the part of the operator and the factor of human error is eliminated as far as possible. The instrument can be arranged so that no more than the maximum permissible load can be assigned to any given loading point or compartment and only one load can be added at a time so that the effect of the addition of each load is demonstrated in turn. Furthermore, the empty weight and the "empty index," i. e. the longitudinal turning moment of the unladen aircraft about an axis through a fixed datum calculated from aerodynamic considerations are at all times shown, so that when the computation is complete, every factor to be taken into account is visible and can be checked against a data sheet. An important advantage is the ease with which the instrument may be adjusted for use in computing the loading of an entirely different type of aircraft from that for which it may at any particular time be adjusted, by exchanging the minimum of parts.

According to the invention, a computor for assessing the position of the centre of gravity of a loaded aircraft has load members each of which corresponds to one of the various loading compartments or points in the aircraft and is displaceable according to the load applied at that point, in which these load members are connected to an indicating member in such a way that the displacement of any load member produces a corresponding displacement of the indicating member proportional to the product of the displacement of that load member and the distance of the corresponding loading point in front of or behind a fixed datum in the aircraft, so that the indicating member shows the relationship of the centre of gravity of the loaded aircraft to the fixed datum. This displacement of each load member may be transmitted to the indicating member by a lever the length of which is arranged to be proportional to the distance of the loading point in front of or behind the datum.

A separate mechanism may be provided corresponding to each loading compartment or loading point of the aircraft, and comprising a loading member displaceable according to the loading at that particular point and a second member displaceable in direct proportion to the product of the displacement of the loading member and the distance of the loading point or compartment in front of or behind the fixed datum in the aircraft, account being taken of the sign of the turning moment to which the displacement of the second member is thus proportional. The sum of the displacements of the first, or load, members of all the mechanisms is transmitted to an indicator which shows the total load, and the algebraic sum of the displacements of the second members produces a displacement of an indicating member which enables the relationship of the centre of gravity of the loaded aircraft to be seen in relation to the fixed datum and indicates the precise position of the centre of gravity in the aircraft. The unloaded weight of the aircraft, and the moment of the unloaded weight about the datum are added to the sum applied to the indicator and the indicating member respectively.

All the load members may be displaced by connecting the mechanism for each loading point in turn to a manually operated driving mechanism, which is also connected to drive a counter mechanism which thus adds together the loads applied to all the loading points in turn and indicates their total. The driving mechanism may also be in permanent driving connection to displace the indicator which may take the form of an index which is thus moved up and down over a graphical chart in which the ordinates correspond to the weight.

The second, or moment, member of each mechanism may be connected to the load member through a lever, the arm of which is of variable length and is adjusted to be proportional to the distance of the loading point from the datum, and the displacements of all the moment members may be added by a flexible ribbon or cord which is looped alternately round fixed guide pulleys and pulleys carried by the moment members, one end of the ribbon being held stationary and the other end being connected to the indicating member, which may conveniently be the graphical chart, over which the index moves up and down, the ribbon producing sideways displacement of the chart, the abscissae of which correspond to the moment of the weight at any instant. The moment of the unloaded aircraft may be applied by displacing that end of the ribbon which is normally held stationary.

An example of a computor according to the invention is illustrated in the accompanying drawings, in which—

Figures 1 and 1A are component parts of a general view of the instrument with the cover partially removed;

Figure 3 is a section of Figure 1 on the line III—III;

Figures 4, 5, 6 and 7 show details of the loading mechanism for one loading point;

Figures 8, 9 and 10 show details of the turning moment mechanism for one loading point;

Figure 11 is a similar view to Figure 1 with the cover in position showing the external appearance of the instrument;

Figure 12 is a detail showing the arrangement of the hand setting knob;

Figure 13 is a detail of the mechanism for showing the total load, and

Figure 14 is a section of Figure 13 on the line XIV—XIV.

Figure 1:
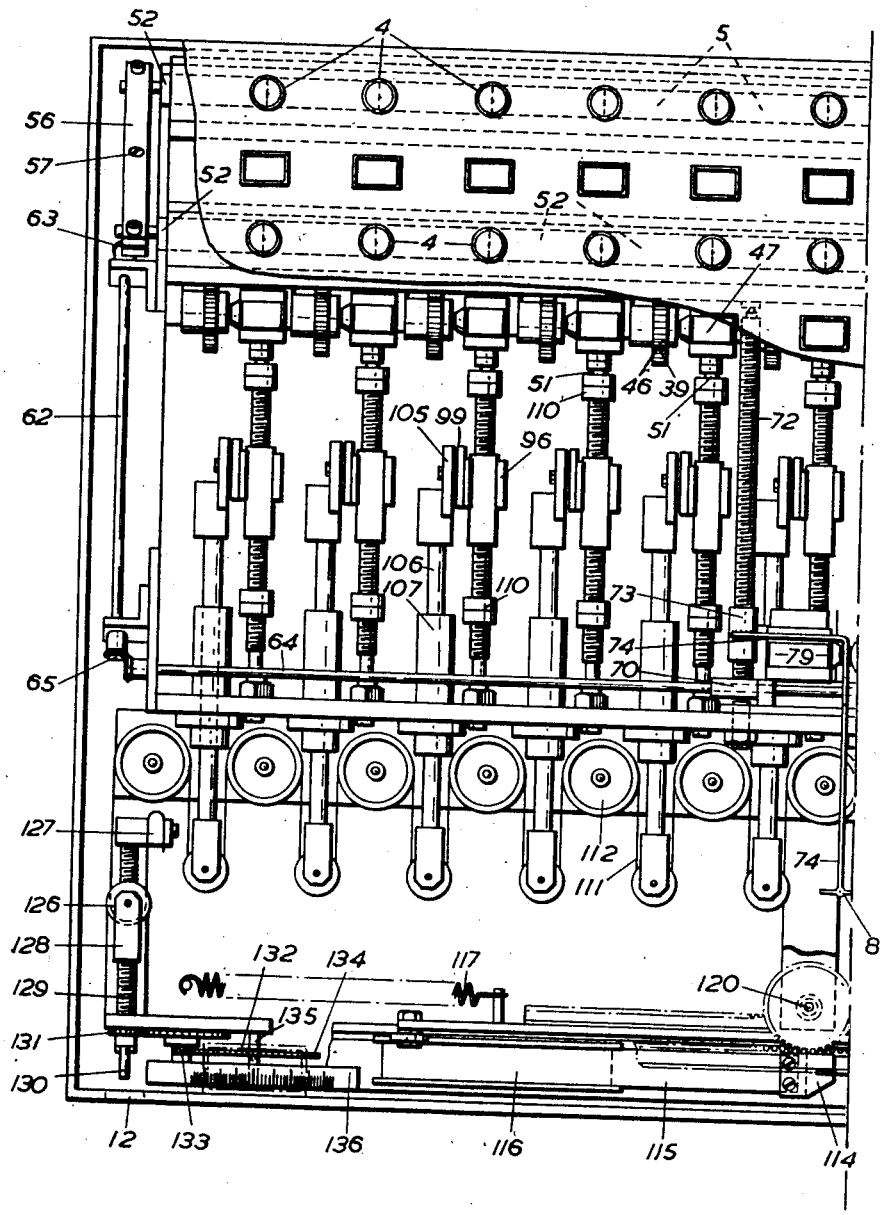
Figure 2:
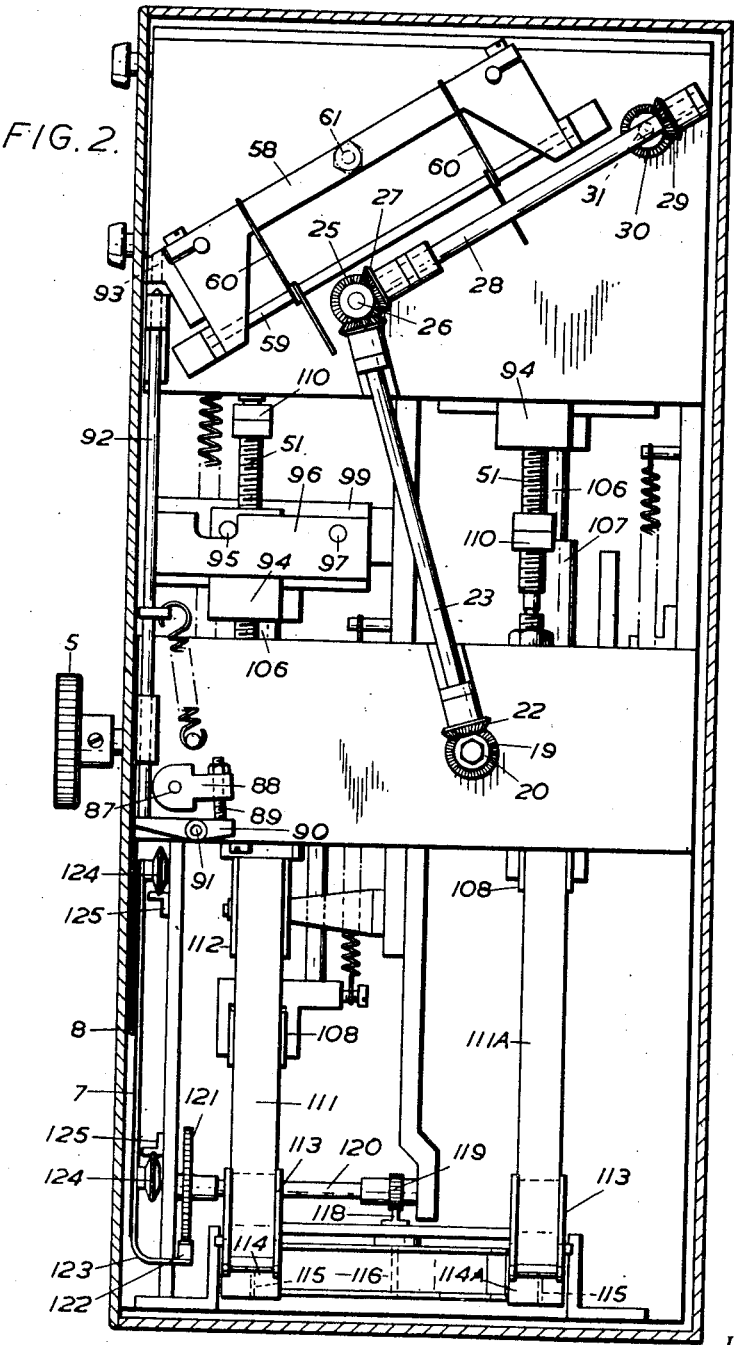
Figure 2 is a section of Figure 1 on the line II—II.

As seen in Figure 1 and Figure 11, the cover 1 of the instrument is provided with windows 2 through which the readings of a number of counting mechanisms 3 are seen. The arrangement of the mechanisms 3 is such that they correspond to the arrangement of the various loading points and compartments in the aircraft. Thus, in Figure 11, the aircraft is divided into twelve upper loading compartments and a further seven lower compartments at certain positions in the aircraft. The instrument shown in Figures 1 to 3 provides for twelve upper and lower compartments, but is arranged in Figure 11 so that not all these compartments are available. The number of loading compartments made available is determined by the arrangement of compartments in the aircraft for which the computor is at any time set. A push-button 4 is provided at each loading point and acts in a way which will be described to connect the counter 3 at its loading point to a hand control knob 5. The lower part of the cover 1 has a large window 6 through which a chart 7 is visible of which the abscissae correspond to the moment of the aircraft about a datum point and the ordinates to the total weight. Diagonal lines 7A on the chart indicate the position of the centre of gravity of the aircraft. An index 8 is movable up and down this window, but not from side to side, while the chart 7 may be moved from side to side, but not up and down, and an area, shown unhatched in the drawing, is marked on the chart within which the index must appear for the loading conditions to be safe. A small window 9 is provided through which a counter is visible which shows the total weight applied at any instant, and alongside this is a window 10 through which can be seen a counter to which the unloaded weight of the aircraft can be applied by applying a key 13A (Figure 3) to a shaft 11 (see also Figures 13 and 14). A socket 12 is provided into which a key 13 can be fitted to enable the "empty index," that is to say, the product of the weight of the unloaded aircraft and the distance of the centre of gravity of the unloaded aircraft from the datum, to be applied and this is indicated in the window 14. Thus all that is accessible to the operator of the instrument are the press-buttons 4, the hand control knob 5 and the key 13, the effect of manipulating which is indicated at the various windows, and the remainder of the apparatus may be sealed into its case to prevent tampering.

As seen in Figures 1, 2 and 12, the knob 5 is secured to a shaft 15 which drives a longitudinal shaft 16 through bevel gears 17 and 18. The shaft 16 carries a further bevel gear 19 which is driven by a shaft through a friction clutch 20 loaded by a spring 21 so that there is no danger of overloading the mechanism if the operator attempts to put a greater load on any loading point than the aircraft can safely carry. The bevel gear 19 meshes with a bevel gear 22 on a shaft 23, which carries at its other end a further bevel gear 24, which drives a bevel gear 25 on a shaft 26. The bevel gear 25 also meshes with a bevel gear 27 on a shaft 28, which carries a bevel gear 29 meshing with a bevel gear 30 on a shaft 31 (Figure 2). The shafts 26 and 31 drive the mechanism for the upper and lower loading points respectively. These mechanisms are similar in all respects. The shafts 26 and 31 extend the length of the computor and carry long spur gears 32 which are in constant mesh with a spur gear 33 of each loading mechanism. The spur gear 33 is carried by a shaft 34 on which a cradle 35 is pivoted carrying two spur gears 36 and 37 is constant mesh with spur gear 33 and engageable with a spur gear 38 and a spur gear 39 respectively. These spur gears are normally held out of engagement by a spring 40 connected to the cradle 35, but may be caused to engage by pressing the spring-loaded push-button 4 retained in a guide 41 by a pin 42 and which bears on the head of a plunger 43 to depress a spring 44 which bears on a spigot 45 carried by the cradle 35. Pressure on the push-button 4 will thus press the spring 44 so that it overcomes the pull on the spring 40 and causes the spur wheels 36 and 38 and the spur wheels 37 and 39 to engage simultaneously.

The spur wheel 39 is free to rotate on a shaft 39A, and meshes with a spur wheel 46 on the shaft of a counter 3. The spur wheel 39 also drives by means of pins 49, a bevel wheel 48, free to rotate on the shaft 39A, and meshing with a bevel wheel 50 on a vertical shaft 51 which is thus driven through pins 51A carried by the shaft 51. Thus if the button 4 is depressed and the hand setting knob 5 is turned, the counter mechanism 3 will be driven to show an increase or decrease in the weight applied to this point and the shaft 51 will be rotated accordingly. The pins 49 and 51A enable the bevel wheels 50, 48 to be interchanged, so that alternative ratios are available.

It is important that it should be impossible to depress two of the buttons 4 at a time, and to prevent this, metal blocks 52 are provided in horizontal guides. These blocks normally butt end to end at positions corresponding to the shafts 53 of the press-buttons 4 and are provided with small semi-circular notches 54 into which the coned tip 55 of the shaft 53 can penetrate and push the blocks 52 apart, thus permitting the button to be pressed inwards. This, of course, results in the displacement of the remainder of the blocks on either side so that none of the other push-buttons 4 in the same row can be pressed. The block 52 at the left-hand end of each row, as seen in Figure 1, bears on a rocker 56 pivoted at 57 so that the movements of the blocks at the left-hand end in one row are transmitted to the other row, but in the opposite direction. Thus the right-hand end of each row of blocks moves to the right and bears on a spring-loaded beam 58 shown in Figures 1 and 2, which is pivoted to turn about a shaft 59 and is pressed against the blocks by springs 60. The movement of this beam is limited by a stop 61. The net result is that when a button 4 is pressed, all the other blocks are moved out of alignment with their corresponding pressbuttons and the movement of the blocks is transmitted to the beam 58 and limited by the stop 61. If an attempt is made to overcome this safeguard by pressing two buttons simultaneously, the adjustment of the stop 61 is such as to limit the permissible movement of the beam 58 so that insufficient clearance can be obtained between the blocks to permit either button to be sufficiently depressed for the spur wheels to engage. When the button is released, the springs 60 act to return the blocks 52 to their original position.

The spur gear 38 extends the length of the instrument and drives a shaft 62 through bevel gears 63 (Figure 1). This shaft transmits by means of bevel gears 65, the rotation of the spur gear 38 to a horizontal shaft 64 which carries a spur gear 66 which meshes with a spur gear 67 on the shaft 68 of a counter mechanism 69, the dial of which is seen through the window 9 (Figure 11). The shaft 64 also carries a worm wheel 70 which meshes with a hob wheel 71 of a vertical shaft 72 which is threaded to carry a threaded sleeve 73 to which is secured an arm 74 bent at right angles and terminating in the index 8. Thus, whenever the hand knob 5 is rotated, and provided that one of the buttons 4 is depressed, the shaft 64 will be driven accordingly, so that the counter mechanism 69 will add or subtract the load added or subtracted at the particular loading point the button of which is depressed, and the index 8 will be raised or lowered accordingly.

To enable the unloaded weight of the aircraft to be applied to this mechanism, the shaft 11, as seen in Figures 13 and 14, carries a bevel gear 75 which is normally held out of engagement with a bevel gear 76 on the shaft 68, and with a similar bevel gear 77 on the shaft 78 of a counter mechanism 79, by the action of a spring 80 on a sleeve 81 which has a grooved collar 82 engaging a flange 83 on the shaft 11.

These bevel gears are engaged by applying the key 13A to the shaft 11, and pressing the key inwards so that the spring 80 is compressed and the bevel gears mesh. If the key 13 is then turned, the counters 69 and 79 are driven in opposite direction, but, as they are oppositely handed, both will show the same increase or decrease in their reading so that the unloaded weight of the aircraft can be registered on the counter 79 which is visible in the window 10. At the same time, the shaft 64 is driven through the spur gears 67, 66 so that the index 8 is raised or lowered correspondingly. As the long spur gear 38 is permanently connected to the shaft 64, this is also driven, and it is, therefore, important that it should be impossible to depress any of the buttons 4 while the bevel gears 75, 76 and 77 are in mesh. To ensure that this cannot happen, a pin 84 on a member 85 carried by an arm 86 keyed to a shaft 87 also engages the grooved collar 82, so that, when the key 13 is pressed in, the shaft 87 is turned. This shaft extends to the right-hand end of the machine, as seen in Figure 1, and, as seen in Figure 2, carries a short crank 88 with an adjustable stop 89 which bears on a rocker 90, pivoted at 91, so as to raise a push rod 92, the upper end of which enters a hole 93 in the beam 58 preventing it from moving under the pressure of the blocks 52, so that no pair of these blocks can divide to permit a button 4 to be depressed.

Each of the vertical shafts 51 is threaded and carries a correspondingly threaded collar 94, as seen particularly in Figures 1, 3 and 8 to 10. The threads of these shafts 51 forward of the datum point are of opposite hand to those behind the datum point, sufficient of each sort of shaft being provided to allow of the computor being adapted to every type of aircraft. The computor is thus universal, and no change in design is necessary to change from one type to another, but only simple adjustments. The collar 94 has a projecting pin 95 against which an arm 96 pivoted at 97 is caused to bear by a spring 98. The arm 96 is in two parts, one on either side of the collar 94, and carries on one side a plate 99 having a longitudinal slot 100. The plate 99 and the two parts of the arm 96 together with spacing sleeves 101, are held together by screws 102. A pin 103 adjustable in a horizontal slot 104 in a T-piece 105, has a head which engages the slot 100 so that the T-piece 105 is raised and lowered as the arm 96 is turned about the pivot 97. The pin 103 is a headed screw which can be locked in any position in the slot 104 by the nut 109. The T-piece 105 is carried at the top of a vertical plunger 106 working in guides 107, and having at its lower end a freely rotatable pulley 108. Thus, for any given vertical movement of the collar 94 there is a corresponding rotation of the arm 96 and slotted member 99, but the consequent vertical movement of the T-piece 105, plunger 106 and pulley 108, is dependent on the effective distance between the pivot 97 and the pin 103, so that if this distance is adjusted to be proportional to the distance of the loading point from the datum point, the vertical movement of the pulley 108 will be proportional to the turning moment of the weight at this loading point about the datum. To allow for the opposite senses of loading points for and aft of the datum point, the bevel drive to the shaft 51 can be reversed, or the thread of this shaft can, of course, be made of opposite hand. As seen in Figure 1 and Figure 3, adjustable collars 110 can be locked on the threaded shaft 51 to limit the vertical movement of the collar 94 to that corresponding to the maximum weight permissible at this point in the aircraft, and also so as to prevent the counters 3 being unloaded beyond zero.

The vertical movements of the pulleys 108 are added together by a flexible ribbon 111 which passes alternately round these pulleys and round freely rotatable stationary pulleys 112. The second bank of loading points is provided for as seen in Figures 1, 2 and 3, by a second ribbon 111A, and at the right-hand end of the instrument both ribbons are carried down round guide pulleys 113, and are connected at 114, 114A to the ends of a ribbon 115 which passes round a pulley 116. The other ends of the ribbons 111, 111A are normally held stationary while load is applied to the computor, so that adjustment of a pulley 108 will result in a horizontal movement of the pulley 116, which is biassed towards the left in Figure 1 by a spring 117, and which carries a rack 118, horizontal movement of which drives a pinion 119 on a shaft 120 which carries a spur wheel 121 meshing with a rack 122. The rack 122 is part of a carriage 123 mounted on rollers 124 running on tracks 125, and this carriage carries the chart 7 (Figure 2), so that any adjustment of the pulleys 108 causes a sideways movement of the chart 7 beneath the index 8. The ribbon 111A is anchored to a point fixed in the instrument case.

To enable the "empty index" to be applied to the chart, the left-hand end of the ribbon 111 passes round a pulley 126 before being anchored at 127. The pulley 126 is mounted to rotate in a threaded collar 128 on a threaded shaft 129, the lower end 130 of which is shaped to take the key 13. The shaft 129 also carries a spur wheel 131 meshing with a spur wheel 132 on a shaft carrying a pinion 133 meshing with a spur wheel 134 on the shaft 135 of which is mounted a cylindrical scale 136 which is visible in the window 14. The scale 136 is graduated to show the moment of the unloaded aircraft about the datum point.

The abscissae of the chart 7 may be graduated in a variety of ways according either to scales showing the moment of the total weight about the datum point, or the distance of the centre of gravity from the datum point, in each case in any convenient units. The ordinates may be graduated to show the total weight of the aircraft and its load, or the load added to the unladen weight of the aircraft. Separate charts are provided for each type of aircraft.

It will be clear that the computor, once set up for a particular type of aircraft, can be easily adapted for some other type having differently distributed loading compartments and different dimensions and characteristics, merely by adjusting the positions of the pins 103 in the slots 104 of the T-piece 105, adjusting the stops 110 for the new safe loading conditions, and exchanging the chart 7 on the carriage 123 for one made out suitably for the new type of aircraft. The whole apparatus may then be sealed again for issue to an unskilled operator. A card or metal plate 137 (Figure 11) provided with holes for those windows 2 and buttons 4 which are to be used with a particular type of aircraft, and masking the remainder, may be fitted to the computor, and carries a diagram showing the arrangement of the loading compartments in the aircraft.

I claim:

1. A computor for assessing the position in relation to a fixed datum in an aircraft of the center of gravity of a loaded aircraft which has various compartments and points at which load is applied, comprising a plurality of load members corresponding to the said compartments and points, means to displace said load members according to the load applied at the said corresponding compartments and points, and an indicator comprising cooperating relatively movable first and second indicating members, means to move said first indicating member upon displacement of any one of said load members by an amount proportional to said displacement, and means to move said second indicating member relative to said first indicating member upon displacement of any one of said load members by an amount proportional to the product of said displacement and the distance of the load represented by said displacement from said datum, such that the relative positions of said first and second indicating members show the relationship of the center of gravity of said loaded aircraft to said datum.

2. A computor according to claim 1, in which the movements of said first and second indicating members are at right angles to each other.

3. A computor according to claim 1, in which the displacement of each load member is transmitted to the second indicating member through a lever having a length which is proportional to the distance of the said loading point in front of or behind the datum.

4. A computor according to claim 3, in which each of said levers embodies means for adjusting the effective length of the lever so that the computor may be readily adapted for use with different aircraft.

5. A computor according to claim 1, further comprising means for displacing the said second indicating member in accordance with the moment about the said datum of the weight of the unloaded aircraft.

6. A computor according to claim 1, and including an indicating counter controlled by the displacements of all the said load members for indicating the total load.

7. A computor according to claim 6, comprising means for adding the weight of the unloaded aircraft to the sum of the displacements transmitted to the said total load counter.

8. A computor according to claim 1 in which one of the first and second indicating means comprises a chart, and the other of said first and second indicating means comprises an index, the graduation of said chart being such that the position of said index relative to said chart represents the total load and also the sum of the moments of all the loads divided by the total load.

9. A computor according to claim 8, in which the said chart is marked to indicate the safe limits between which the total load and the position of the center of gravity must lie.

10. A computor according to claim 1, in which the means for displacing the said load members comprises means to connect said load members one at a time to a manually operated driving mechanism, and means to connect simultaneously said manually operated driving mechanism to a counter mechanism which thus adds together the loads applied to all the loading points and indicates their total.

11. A computor according to claim 10, in which at each loading point a counter mechanism is connected to said load member to indicate the load applied at that point.

12. A computor for assessing the position in relation to a fixed datum in an aircraft of the center of gravity of the loaded aircraft which has various compartments and points at which load is applied, comprising a plurality of mechanisms, each corresponding to a load and comprising a load member and a moment member, means to displace said load member in direct proportion to the magnitude of said load, means to displace said moment member in direct proportion to the product of the displacement of said load member and the distance of said load from the fixed datum, means to add the displacements of said moment members algebraically, and an indicator comprising cooperating relatively movable first and second indicating members, means to move said first indicating member upon displacement of any one of said load members by an amount proportional to said displacement, said second indicating member being connected to said adding means so as to move relative to said first indicating member upon displacement of any one of said movement members such that the relative positions of said first and second indicating members show the relationship of the center of gravity of said loaded aircraft to said datum.

13. A computor according to claim 12, in which the said adding means comprises a flexible ribbon or cord looped alternately around fixed guide pulleys and around pulleys carried by the said moment members which are capable of movement in a direction at right angles to the general direction of the fixed guide pulleys, one end of the cord or ribbon being normally held stationary and the other end being connected to said second indicating member.

14. A computor according to claim 13, in which the said normally stationary end of said ribbon or cord is displaceable lengthwise thereof to apply the moment of the unloaded aircraft about said datum.

15. A computor according to claim 12, in which the driving mechanism comprises, at each loading point, a spur wheel in permanent driving connection with a manually operated driving knob and permanently meshing with a second spur wheel mounted in a cradle capable of pivoting about the axis of the first spur wheel, a manual control being provided to swing the cradle so that the second spur wheel engages a spur wheel of the mechanism for that loading point.

16. A computor according to claim 15, in which a third spur wheel is carried in the cradle, permanently in mesh with the first spur wheel and so arranged that when the second spur wheel meshes with the loading mechanism, the third spur wheel meshes with a spur wheel from which the said first indicating member and a total load counter are driven.

17. A computor according to claim 15, in which the said manual control for each cradle is a push button, and means interlocking said push buttons for preventing depression of more than one button at a time.

18. A computor according to claim 17, in which the push buttons are carried on shafts having coned tips and the interlocking means for preventing more than one push button being depressed at one time comprise a series of blocks, displaceable at right angles to the displacement of the push buttons, between which the coned tips of the shafts of the push buttons must pass, the total displacement of all the blocks being limited to that sufficient to admit the shaft of one push button.

19. A computor according to claim 18, in which the said indicator comprises a first counter showing the total weight, a lead screw which acts to displace said first indicating member, a second counter which may be connected to said first counter and said lead screw by gearing which is normally disengaged but which may be engaged by inserting a winding key so that the unladen weight of the aircraft may be added to the indicator and shown on said second counter, and means to prevent said blocks from separating, operated by the insertion of said key to prevent any of said push buttons being depressed.

20. A computor according to claim 12, in which the mechanism at each loading point comprises a counter to indicate the load applied at that point, and a lead screw which displaces the said load member at that point causing a slotted lever to turn, and a headed pin carried by the said moment member at that point, which is movable in a direction parallel to the direction of movement of the load member, engages the said slotted lever such that the path followed by the pin is at a distance from the fulcrum of the said lever directly proportional to the distance of the said loading point from the datum.

21. A computor according to claim 20, in which adjustable collars are provided on each lead screw to limit the movement of the load member to the maximum safe load at the corresponding point in the aircraft, and to prevent the load applied at that point being reduced to less than zero.

22. A computor according to claim 20, in which for each loading point, the said pin is carried in a slot in a T-piece forming part of the moment member and can be locked at any position in this slot.

23. A computor according to claim 12, in which the said indicator comprises a first counter which indicates the total weight and a lead screw which acts to displace the said first indicating member.

24. A computor according to claim 23, in which the said indicator also includes a second counter which may be connected to the said first counter by gearing which is normally disengaged but which may be engaged by inserting a winding key so that the unladen weight of the aircraft may be added to the indicator and shown on said second counter.

25. A computor according to claim 24, in which means are provided to prevent the operation of said loading point mechanisms when the gearing for connecting the first and second counters together is engaged.

26. A computor according to claim 1, in which stops are provided to limit the movements of each load member to the maximum safe load at the corresponding point in the aircraft, and to prevent the load applied at that point being reduced to less than zero.

27. A computor according to claim 12 wherein said means for displacing said moment member includes an adjustable element for varying the amount of displacement of the moment member in accordance with the distance of the load from the fixed datum, whereby said computor may be adjusted for different spacings of the loading points for the aircraft.

JACK CARREYETTE.

References Cited in the file of this patent
UNITED STATES PATENTS

| Number | Name | Date |
|---|---|---|
| 2,179,822 | Imm | Nov. 14, 1939 |